United States Patent [19]

Koller

[11] Patent Number: 4,539,832
[45] Date of Patent: Sep. 10, 1985

[54] HOLE SIZING TOOL
[75] Inventor: Joseph A. Koller, Dousman, Wis.
[73] Assignee: Balax, Inc., North Lake, Wis.
[21] Appl. No.: 533,360
[22] Filed: Sep. 19, 1983
[51] Int. Cl.³ .............................................. B23G 7/02
[52] U.S. Cl. ..................................... 72/118; 10/140;
10/152 T; 29/566
[58] Field of Search ..................... 29/566, 565; 10/140,
10/141 R, 152 T; 72/112, 118, 479; 76/101 B

[56] References Cited
U.S. PATENT DOCUMENTS 3,067,509 12/1962 Welles, Jr. ......................... 29/566 X
3,097,426 7/1963 Hill .................................... 29/566 X Primary Examiner—Z. R. Bilinsky
Attorney, Agent, or Firm—Wheeler Law Firm

[57] ABSTRACT

A hole sizing tool uses a swaging tap to move material which deforms the sides of a generally cylindrical hole toward the axis of the cylinder and is followed by a portion of the tool having a generally flat flaced helical spiral configuration with the turns increasing in radius as the tool advances but with all portions of the surface of the helical spiral including lines parallel to the axis of the tool whereby only radial forces are exerted by said portion to force the sides of the hole gradually toward a final diameter larger than that left by the tap but smaller than the original dimension. In an alternate form of the tool the flat surfaces of the helical spiral are inclined slightly, so that the edge of such surface nearest the nose of the tap is at a slightly greater radius than the edge of the turn nearest the tool in which the tap is held, to generate a slight axial force tending to pull the tool into the work. The portion of the tool following the helical spiral is a smooth burnishing surface for the purpose of burnishing the hole to final size and finish. Both the increasing helical spiral portion and the constant size burnishing portion desirably have the periodic increases in radius (or lobes) characteristic of the threads of a swaging tap, but without thread crests and roots. If desired, the nose of the tap may have a cylindrical lead portion for alignment, particularly if the tool is not intended for blind holes.

15 Claims, 10 Drawing Figures

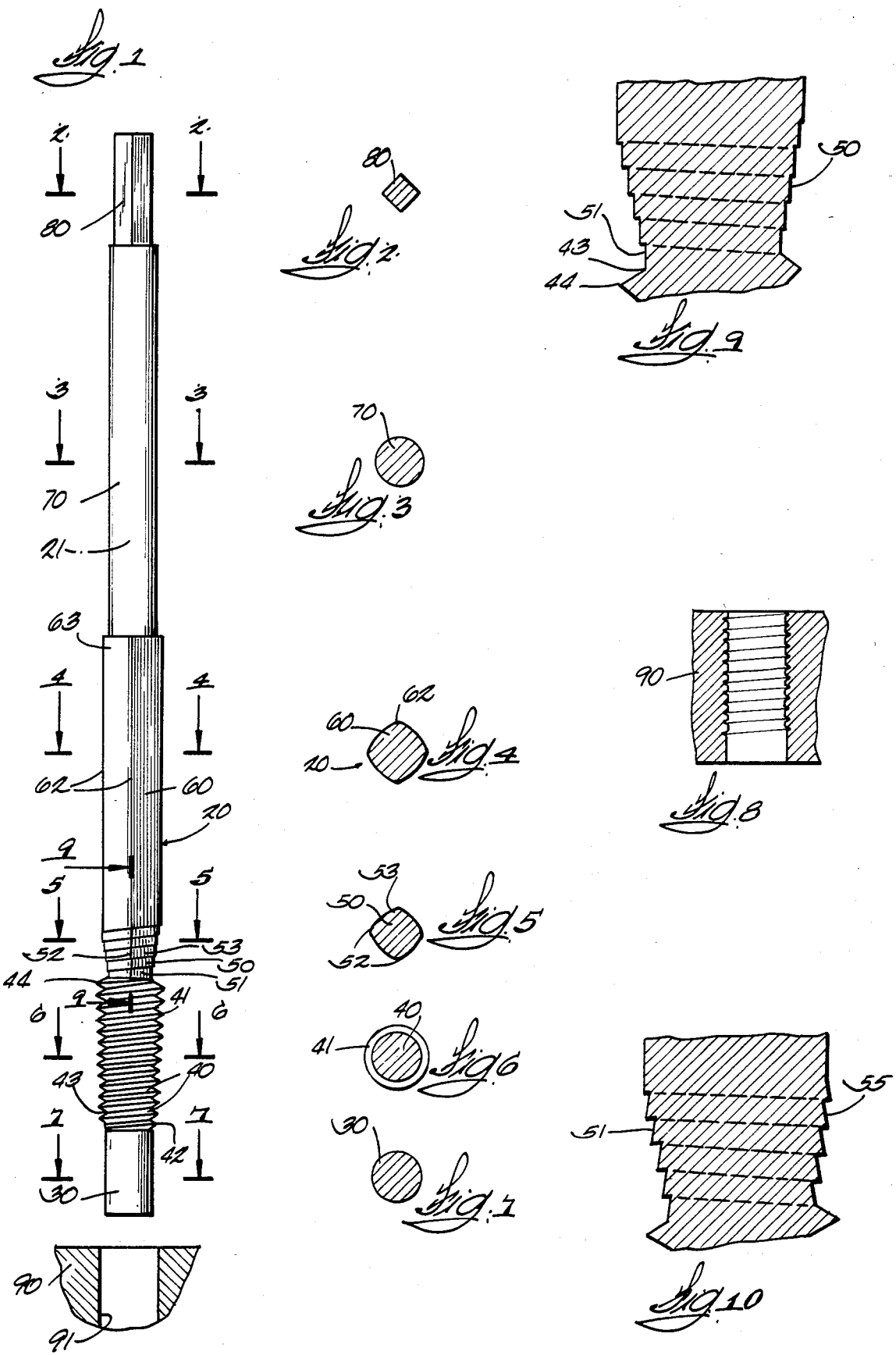

HOLE SIZING TOOL

BACKGROUND OF THE INVENTION

It is known in the prior art to use a swaging tap to push metal or other malleable material from the walls of an oversized hole toward the axis of the hole to reduce the effective diameter of the hole. Thus, the diameter of the resized hole has only narrow thread crests which are relatively weak at the smallest diameter. This was corrected by using a reamer to remove the metal at the crests of the threads to the correct diameter throughout the hole. That process left a hole which was still threaded but in which the crests of the threads had been removed to a uniform diameter. No metal was displaced from the thread crest to widen the crest more than the cutting action of the reamer did. In this invention the crest metal is not lost, but is displaced to add to the bearing surface of the re-sized hole.

The reaming method sacrificed some of the metal, thereby weakening the part. The use of a reamer can produce burrs and may not be as accurate in sizing the hole as the method of the present application.

Van Vleet U.S. Pat. Nos. 3,220,032 and 3,237,485 disclose the thread forms of a swaging tap which are most useful in the lead section of the tool disclosed herein because the use of those thread forms produces balanced axial forces at the two flanks of each turn of the thread and therefore do not tend to break the thread as readily as other thread geometries. Those patents relate only to the threading portion of the present tool, however. They do not disclose the remaining portions of the tool which are essential in forming a complete tool according to this invention.

Other patents known to applicant are Welles U.S. Pat. No. 3,067,509 and Hill U.S. Pat. No. 3,097,426. Each of these discloses a single tool for resizing a hole, and each shows a swaging tap section having tapered threads. The Hill patent also shows that the threads of section 18 are flattened to a constant outside diameter. However, that section is not the section that forms the final diameter of the hole. The final diameter is formed by reamer section 22. Each of these patents shows reamer sections for finishing the hole to its final size with the difficulties that such a process entails. None of these patents show the special surfaces found in the sections of the tool of the present invention which follow the swaging tap section. It is that combination of surfaces which gives the present tool its unique quality.

SUMMARY OF THE INVENTION

According to this invention, a single tool is provided capable of performing the steps of swaging a thread in the inside of the hole, and then re-swaging the metal rather than reaming it, to form it to the correct diameter with no loss of material as would be present when using a reamer, followed by burnishing to produce a smooth hole having the most uniform possible diameter and the smallest possible deviation from a uniform surface. The surface has more bearing area for a part such as a shaft that is later to be inserted in the re-sized hole. The second swaging step further work hardens the workpiece, which is also desirable in a bearing surface. Reaming does not work harden. The finer thread roots left by the burnishing step are better suited to retain oil if a lubricated surface is needed, as its usually is for a rotating part.

In addition, the portion of the tool following the tap section has a unique form in which the surface has the form of a flat strip wound in a helical spiral about an imaginary cone, preferably a lobed cone, and all surfaces of the helical spiral contain lines parallel to the axis of the tool. In an alternate form all parts of the surface which may be considered as a strip wound around the cone have the edge of the strip nearest the nose of the tool at a slightly greater radius than the edge of the strip nearest the end of the tool which is held in a tool holder of a machine. In the first form all axial forces are balanced. The tap threads are likewise formed to balance axial forces as shown in Van Vleet U.S. Pat. Nos. 3,220,032 and 3,237,485 in order to apply purely radial net force to the metal being swaged. The alternate form generates a force which is almost purely radial but which includes a slight component directed axially toward the nose of the tool to pull the tool into the work. The latter feature is optional.

The flat helical spiral swaging section and the smooth lobed burnishing section may be made as a complete tool, without the tap re-sizing section, to just size and burnish a hole that is at or smaller than the desired size. Such a tool leaves an excellent surface finish and is not previously known.

The final portion of the tool has lobes or changes in radius like a swaging tap but has no thread crests or valleys whatever and serves to polish or burnish the hole which is being resized to its final diameter and finish.

The pilot portion of my tool feeds smoothly into the swaging tap section, which feeds smoothly into the threadless helical spiral, which feeds smoothly into the burnishing section. Desirably this is accomplished by grinding or otherwise providing a smooth transition between sections.

It is desirable in the swaging tap section to apply the lead correction geometry specified in Van Vleet U.S. Pat. No. 3,237,485 in order that the material being swaged does not have to be moved axially unnecessarily. This structure helps to balance the axial forces produced by the respective flanks of the respective thread turns of the swaging tap in order to reduce the forces on the swaging tap lead section as much as possible and prolong its life. However, the latter feature is not a part of the present invention but is merely a desirable feature of the tool.

DESCRIPTION OF THE DRAWINGS

FIG. 1 is a side elevational view of the tool of this invention showing the tool about to enter an oversized hole in a workpiece.

FIG. 2 is a cross-sectional view on line 2—2 of FIG. 1.

FIG. 3 is a cross-sectional view on line 3—3 of FIG. 1.

FIG. 4 is a cross-sectional view on line 4—4 of FIG. 1.

FIG. 5 is a cross-sectional view on line 5—5 of FIG. 1.

FIG. 6 is a cross-sectional view on line 6—6 of FIG. 1.

FIG. 7 is a cross-sectional view on line 7—7 of FIG. 1.

FIG. 8 is an axial cross-sectional view of a hole that has been resized using the tool of FIG. 1.

FIG. 9 is a cross-sectional view along 9—9 of FIG. 1, greatly enlarged.

FIG. 10 is a view like FIG. 9 but showing a tool with a modified hole resizing surface.

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

FIG. 1 of the drawing shows the tool of my invention about to enter a hole in a workpiece which is to be resized. FIGS. 2-7 are cross-sectional views at the indicated points along the axis of the tool. FIG. 8 shows the effect of the tool on the workpiece shown at the bottom of FIG. 1 and FIG. 9 is a cross-sectional view of the tool in the axial plane, greatly enlarged, showing the surface of the most unique portion of my tool more clearly. FIG. 10 is a similar view showing the surface of an alternate version of my tool.

As best shown in FIG. 1, tool 20 has a pilot portion 30 which is a smooth cylinder, a swaging tap lead portion 40, a helical spiral ramp 50, a burnishing lobe portion 60, a cylindrical shank portion 70 and a square portion 80 to be held in a conventional machine tool holder such as a chuck which rotates the tool and advances as the tool moves into the workpiece 90.

Workpiece 90 has a hole 91 which is too large and needs resizing. Applicant's tool 20 accomplishes that in a new and better way. Cylindrical lead 30 is conventional and merely guides the tool into the hole. It may be of any length appropriate for that purpose or may be omitted if not needed in a particular application.

The next section of applicant's tool is tap lead section 40 which is ground to enter the work smoothly with section 30 in the hole to be re-sized. Section 40 is constructed like the lead section of the swaging tap of Van Vleet U.S. Pat. No. 3,237,485, in general. It is provided with a thread or threads 41 each having a crest 42 and a root 43, the thread progressing in a helical spiral from smaller crest 42 to the largest crest 44, all of the crests of the thread being kept at the theoretical pitch for such a thread by the methods shown in U.S. Pat. No. 3,237,485 to balance the axial forces on the flanks of the threads and to prevent the occurrence of threads which are off pitch and thus would move the malleable metal of the workpiece axially unnecessarily. Section 40 may, if appropriate, contain a section of threads 44 which are at the largest diameter but do not increase in diameter, in order to be sure that all of the threads formed in the hole 91 in workpiece 90 have reached a desired smaller diameter so that the hole 90 may be effectively resized throughout to the desired dimension and uniformity. The inclusion of a number of threads of the largest diameter 44 especially requires the methods of the above Van Vleet patent to assure that all of the threads will be on the correct pitch line.

The effect of the swaging tap section of the tool is to leave hole 91 threaded as though it were to receive a threaded fastener. Depending on the requirements of the resizing operation it may or may not be threaded to the full depth of a thread intended to receive a fastener but in any case the malleable material of the workpiece 90 has been upset of forced from its original position towards the axis of the hole 91 to form threads by the action of the tap. Thus that material is closer to the axis of the hole than it was originally and may be further formed to make a new surface at a smaller diameter. The tap section of the tool may be omitted from a tool to be used to finish a hole at or slightly smaller than the final diameter which needs only slight enlargement and burnishing, or burnishing alone.

The next section of applicant's tool, the helical spiral ramp 50, serves that function. It is essential to the invention. As may be seen in FIG. 1, and much more clearly in FIG. 9 the first turn 51 of the ramp 50 is ground or formed to feed smoothly into hole 91 following threads 44. Spiral helical ramp portion 50 has the form of a flat strip which has been wound in a helical spiral about the surface of a theoretical cone coaxial with the axis 21 of tool 20. However, as best shown in FIG. 5 the theoretical cone is not a smooth circular cone but increases in radius periodically to form lobes 52 like the lobes of a swaging tap with the exception rather than being threaded like the preceeding section, the surface of the ramp 50 is flat in the axial direction, that is to say, any plane through axis 21 that extends through a turn 51 of ramp 50 forms a straight line where it intersects the surface of ramp 50. As shown in FIG. 5 in any given turn the radius increases and decreases regularly and smoothly so that the crests 52 of the lobes do the work of swaging the malleable workpiece 90 to displace the material that has been formed into thread crests radially outwardly again to form a cylindrical surface. As the successively larger radius turns 51 of ramp 50 pass a given point in hole 91 the successively larger radius lobes 52 of ramp 50 gradually displace the malleable material of the workpiece radially outwardly to bring the cylindrical surface 91 of the hole to its final resized diameter, which is smaller than the diameter of the original hole, but larger than the minor diameter of the thread formed as the swaging tap section 40 passed through hole 91 in workpiece 90.

Ramp 50 blends smoothly into burnishing section 60 of tool 20, which is a section having lobes 62 and relieved sections 63 between them, but all of the lobes 62 lie at substantially the same diameter to produce a burnished surface at the final diameter of hole 91 without changing its size. In effect, section 60 of the tool is a continuation of section 50 but instead of increasing smoothly in radius so that each lobe 52 is at a slightly greater radius than the previous lobe as in section 50, in section 60 each lobe 62 is at the same radius as all of the others. If desired some of the lobes may be slightly reduced in radius after the first ones (as may be the case in a swaging tap) to reduce friction and to finish the surface while guiding the tool. Both full-sized lobes for the length of section 60 and slightly reduced lobes such as would be found on a swaging tap are within this invention.

Sections 70 and 80 of the shank of the tool are respectively circular and square in cross section as shown in FIGS. 3 and 2 but may have other configurations as required by the mounting means such as a tool chuck provided on the tool in which they are to be used. Likewise the length of these sections depends on the length required for the particular machine in which they are to be used. These sections are conventional and merely provide a tool of the proper length with the ability to be held in a machine capable of turning it at the proper rate and advancing it at the proper rate so that the tool may be used to re-size a hole in a workpiece.

FIG. 10 shows a slightly modified form of swaging ramp section 50. Ramp 55 differs from ramp 50 only in that the surface of the ramp is not parallel to the tool axis in any axial plane but is inclined slightly to form a very shallow cone opposite in slope to the theoretical cone on which the ramp is formed to cause a small axial force tending to pull the tool into the workpiece 90. Such a surface forms a line at its intersection with an axial plane which intersects the axis if extended toward the end of the tool that is held by a machine to be rotated, generally by a tool chuck. This modification assists in pulling the tool into the work.

I claim:

1. A hole re-sizing tool comprising a shaft having an axis, said shaft having a rear driven end and a front work-entering end provided with a swaging tap section having forming threads increasing in size axially away from the front end shaped to upset the material of a work piece to at least partially form a thread, a threadless ramp surface on said tool beginning at the end of the swaging tap section furthest from the front end of the tool, said surface having the form of a helical spiral having a surface all parts of which contain substantially straight lines in the plane of said axis, the smallest turn of said ramp being directly adjacent the root of the largest turn of the swaging tap section and having substantially the same radius as said root, said helical spiral increasing in diameter in a direction along the helical spiral to a maximum diameter smaller than the maximum diameter of the crest of the thread in said swaging tap section, said ramp surface being shaped to flatten threads formed by said swaging tap section to the maximum diameter of said ramp.

2. The device of clam 1 in which the thread of the swaging tap lead section is provided with lobes of progressively increasing size on each turn of the thread in a direction away from said front end.

3. The device of claim 2 in which at least one turn of the swaging tap section of the tool includes threads having lobes of a maximum radius in which each lobe has the same maximum radius.

4. The device of claim 1 in which each turn of the ramp includes a plurality of lobes of progressively increasing radius in a direction around said helical spiral away from the front end, and a plurality of radially relieved sections between the lobes.

5. The device of claim 1 in which the helical spiral ramp section of the tool is followed smoothly by a burnishing tool section having an unchanging maximum radius, said burnishing section being farther from the front end than said ramp.

6. The device of claim 5, in which the burnishing section of unchanging maximum radius has its maximum radius at periodic lobes and has radially relieved sections between the lobes of lesser radius.

7. The device of claim 5 in which the burnishing section includes a portion in which the lobes of maximum radius diminish slightly in radius to allow the displaced metal to relax and take a good finish.

8. The device of claim 1 in which the surface of the section of the tool which comprises a helical spiral ramp is so formed as to include lines parallel to the axis of the tool at substantially all portions of said surface.

9. The device of claim 1 in which the ramp surface is inclined so that the extension of a straight line drawn on such surface in an axial plane will intersect the axis of said tool at a point more remote from the front end of the tool, whereby to cause an axially directed force tending to move the tool into the work as the tool is rotated.

10. A workpiece hole sizing and burnishing tool having an axis, a driven end, and a front end, and rotatable on said axis, comprising a helical spiral swaging ramp section in which the turns have the form of a generally flat surface wound on a theoretical cone coaxial with the axis, the turns increasing in diameter away from the front end to a maximum size, and a burnishing section in which the maximum diameter remains substantially constant.

11. The tool of claim 10 in which the ramp has lobes of increased diameter along its circumference in a direction away from the front end, and radially relieved areas between the lobes.

12. The tool of claim 10 in which the burnishing section has lobes along its circumference and radially relieved areas between the lobes.

13. The device of claim 10 in which any axial plane of the tool intersects the ramp in a line parallel to the axis.

14. The device of claim 10 in which any axial plane of the tool intersects the ramp in a line which, if extended, intersects an extension of the axis of the tool.

15. The device of claim 10 further comprising a swaging tap section for forming a thread in a workpiece between said front end and said ramp section, to resize a hole.

* * * * *